E. LOCKE.
DRY LIME LINER.
APPLICATION FILED JUNE 14, 1919.
1,322,705. Patented Nov. 25, 1919.
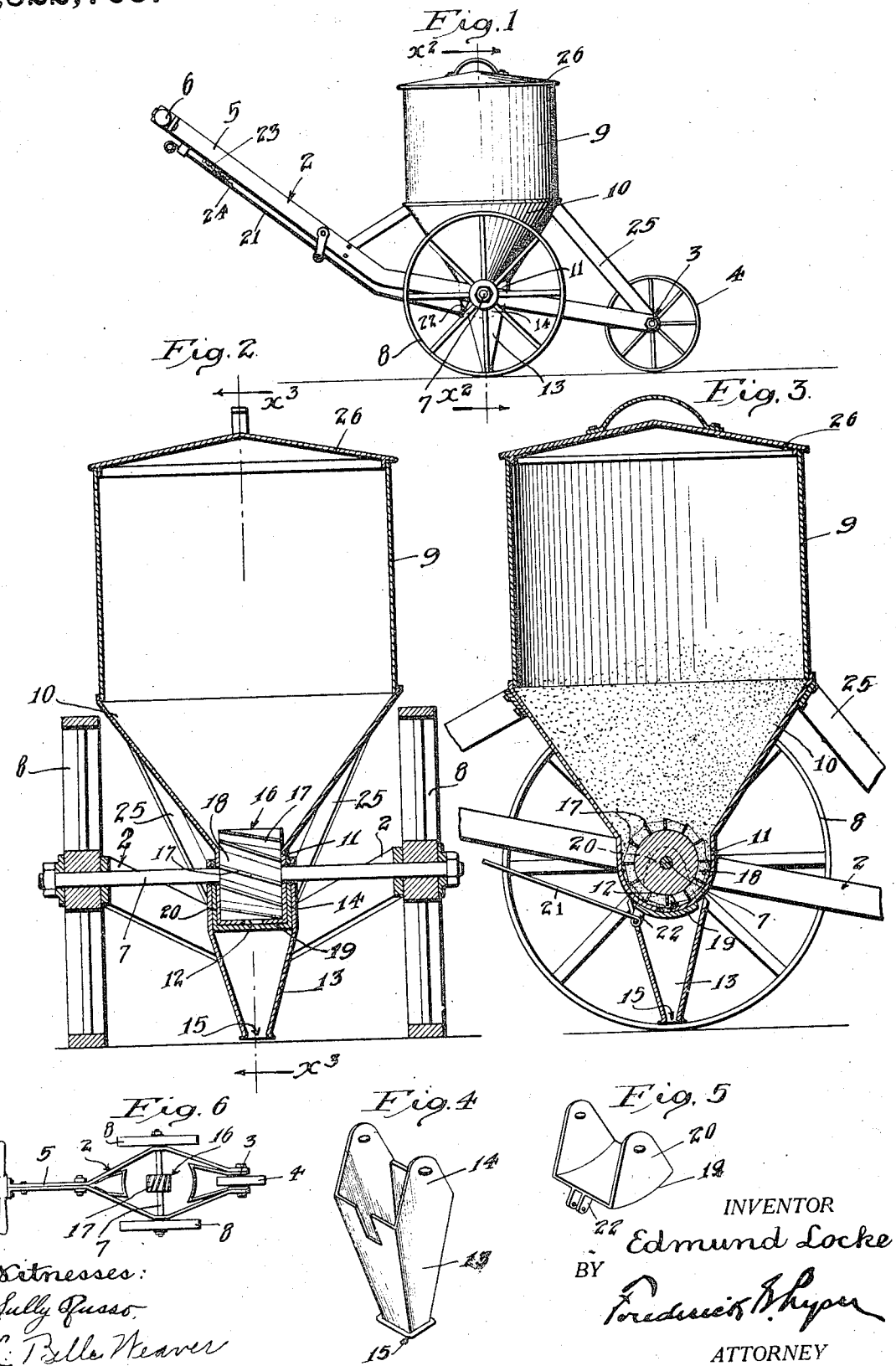
INVENTOR
Edmund Locke
BY
Frederick B. Hyper
ATTORNEY
Witnesses:
Sully Russo
L. Belle Weaver

UNITED STATES PATENT OFFICE.

EDMUND LOCKE, OF BEVERLY HILLS, CALIFORNIA.

DRY-LIME LINER.

1,322,705.

Specification of Letters Patent.   Patented Nov. 25, 1919.

Application filed June 14, 1919.   Serial No. 304,170.

*To all whom it may concern:*

Be it known that I, EDMUND LOCKE, a citizen of the United States, residing at Beverly Hills, Los Angeles county, California, have invented a new and useful Dry-Lime Liner, of which the following is a specification.

My invention relates to a dry lime liner being particularly a device utilized for lining off and marking athletic fields of various kinds, for example, the boundary lines of tennis courts.

An object of my invention is to provide a device of the character referred to which will be readily operated and which will discharge upon the surface desired a continuous and measured amount of dry lime or other suitable material.

A further object of my invention is to provide a device of that character which may be readily operated to mark out a straight and unwavering line and which in so doing will discharge the lime at a point immediately above the desired trace.

Other objects and advantages will appear from the subjoined detailed description.

In the drawings:

Figure 1 is a side elevation of my dry lime liner.

Fig. 2 is a vertical section of the same taken on the line indicated by $x^2$—$x^2$ in Fig. 1 with the feed rotor illustrated in full.

Fig. 3 is a vertical section taken on the line indicated by $x^3$—$x^3$ in Fig. 2.

Fig. 4 is a perspective view of the marking spout illustrated in the above figures.

Fig. 5 is a perspective view of the cut-off for the hopper illustrated in the same.

Fig. 6 illustrates a diagrammatic plan view of the frame for my device.

Referring to the drawings there is provided a frame comprising downwardly and forwardly inclined side bars 2 which are forwardly and rearwardly converging. The side bars 2 at their forward ends unite to form a bearing for an axle 3 upon which is rotatably mounted a light guide wheel 4. At the rear juncture of the side bars 2 the same unite to form an upward extension 5 to which is secured a transverse handle grip 6. Intermediate their ends the side bars 2 are apertured to receive an axle 7 to which are keyed side wheels 8.

A cylindrical hopper 9 having a frusto-conical discharge portion 10 at its lower end is mounted centrally between the side bars 2. The lower end of the hopper 9 is formed with a semi-circular trough 11 having a discharge port 12. A rectangular marking spout 13 is secured by ears 14 to the trough 11. The marking spout 13 is downwardly contracting to form a discharge nozzle 15 closely alined with the bottom of the wheels 8. The trough 11 and the ears 14 are apertured to rotatably receive the axle 7.

Keyed to the axle 7 and mounted within the semi-circular trough 11 is a feed rotor 16 which is provided with spaced inclined veins 17 which form helical grooves 18. The veins 17 are so inclined that the bottom of each groove 18 is lower than the top of the next lowermost groove for a reason which will be more clearly hereinafter explained.

A cut-off plate 19 is mounted by ears 20 upon the axle 7 and fits around the bottom of the trough 11, covering the port 12. An operating bar 21 is fixed at one end between the lugs 22 of the cut-off 19 and extends upward adjacent the handle grip 6. A ratchet 23 carried by the extension 5 and a spring 24 carried by the bar 21 constitute means for adjustably holding the bar 21 and cut-off 19 in fixed relation to the trough 11.

A brace 25 extends from the forward juncture of the side bars 2 to the hopper 9. The hopper 9 is preferably provided with a suitable cover 26.

In practice the operation of my dry lime liner is as follows:

A quantity of sifted dry lime is supplied to the hopper 9. The guide wheel 4 is then alined with the desired mark and the operator by means of the handle grip 6 propels the liner to form the line in the manner hereinafter described. It is to be noted that the guide wheel 4 in connection with the pair of wheels 8 provides an accurate means of marking a straight unwavering line. As the wheels 8 are turned the feed rotor 16 is rotated through the axle 7. The dry lime will enter between the helical grooves 18 and will be carried by the rotor downwardly around the semi-circular trough 11 until the port 12 is reached, at which point, if the cut-off 19 is open, the lime will be discharged into the spout 13. The dry lime will then be carried downward by gravity through the spout 13 to the discharge nozzle 15 and will be there discharged to form the desired line. Note that as the discharge nozzle 15 is spaced adjacent the surface to which the line is to be applied the lime will not be blown about because of falling in the open for any distance and the resultant line will be distinct and not blurred.

As each helical groove 18 is higher at its uppermost end than the bottom of the next preceding helical groove a continuous supply of dry lime will be discharged through the port 12 into the spout 13. The resultant line will therefore be absolutely continuous and there will be no skips or omitted portions as is common with the devices now utilized in the art.

The cut-off 19 provides means for predetermining the amount of lime to be discharged and the operator may therefore mark out a line of the desired size or distinctness. By manipulation of the rod 21 the cut-off 19 may be adjusted to open or close the port 12 to the desired amount. If the cut-off 19 is partially closed at the port 12 a portion of the lime carried along in the grooves 18 of the feed hopper 16 will be carried onward past the port 12 and upward again by the feed hopper. Thus if the cut-off 19 entirely close the port 12 the liner may be propelled as desired without any mark being made or lime expended and the feed rotor 16 will not become jammed.

As the marking spout 13 is loosely pivoted to the axle 7 by the ears 14, if in passing over uneven ground the spout strikes any object or projection it will be swung backward on its pivot. There will be no waver in the line being formed and the construction referred to insures the spout against damage due to such possible contact.

Further attention is directed to the fact that the construction of my liner is such that it may be propelled either forward or rearward. In either case the marking of the line will be continued.

It is thus seen that with my dry lime liner it is possible to readily mark a straight and continuous line, and that the said line will not become blurred by reason of the lime being blown about while passing from the hopper onto the surface to be marked, and that the distinctness and fullness of such line, regardless of unevenness of ground, may be conveniently varied as desired.

Any marking material may be utilized in my invention and it is not in any manner limited to the details of construction above described or illustrated in the drawing, but is of the scope set forth in the appended claims.

I claim:

1. A dry lime liner comprising a frame having forwardly converging side bars, a guide wheel rotatably mounted between the forward ends of said side bars, side wheels rotatably mounted intermediate the ends of said side bars, a lime receiving member supported by said frame, and means for discharging lime carried by said receptacle in the path of said guide wheel.

2. A dry lime liner comprising a frame having converging side bars, a guide wheel rotatably mounted between the ends of said side bars, side wheels rotatably mounted intermediate the ends of said side bars, a lime receiving member supported by said frame, and means for discharging lime carried by said member in the path of said guide wheel.

3. A dry lime liner comprising a frame having converging side bars, a guide wheel rotatably mounted between the ends of said side bars, an axle rotatably journaled intermediate the ends of said side bars, side wheels carried by said axle, a lime receiving member supported by said frame, a marking spout alined with said guide wheel, and a feed rotor rotatably mounted upon said axle adapted to convey lime from said lime receiving member and discharge the same into said marking spout.

4. A dry lime liner comprising a bifurcated frame, a guide wheel rotatably journaled between the furcations of said frame, side wheels rotatably journaled on the frame, a lime receiving member supported between the furcations of the frame, and means in longitudinal alinement with the guide wheel for discharging lime carried by said member.

Signed at Los Angeles, California, this 4th day of June 1919.

EDMUND LOCKE.

Witnesses:
LEONARD S. LYON,
L. BELLE WEAVER.